US009367932B2

(12) United States Patent
Racape et al.

(10) Patent No.: US 9,367,932 B2
(45) Date of Patent: Jun. 14, 2016

(54) METHOD AND DEVICE FOR RECONSTRUCTING A SELF-SIMILAR TEXTURED REGION OF AN IMAGE

(75) Inventors: Fabien Racape, Rennes (FR); Jerome Vieron, Paris (FR); Simon Lefort, Ste Gemmes d'Andigne (FR); Olivier Deforges, Amanlis (FR); Marie Babel, Acigne (FR)

(73) Assignee: Thomson Licensing (FR)

( * ) Notice: Subject to any disclaimer, the term of this patent is extended or adjusted under 35 U.S.C. 154(b) by 62 days.

(21) Appl. No.: 13/989,088

(22) PCT Filed: Nov. 10, 2011

(86) PCT No.: PCT/EP2011/069855
§ 371 (c)(1),
(2), (4) Date: Nov. 14, 2013

(87) PCT Pub. No.: WO2012/072402
PCT Pub. Date: Jun. 7, 2012

(65) Prior Publication Data
US 2014/0064630 A1    Mar. 6, 2014

(30) Foreign Application Priority Data
Nov. 29, 2010 (EP) .................................. 10306308

(51) Int. Cl.
G06K 9/36 (2006.01)
G06K 9/46 (2006.01)
G06T 9/00 (2006.01)
(Continued)

(52) U.S. Cl.
CPC ................. *G06T 9/007* (2013.01); *G06T 7/402* (2013.01); *G06T 11/001* (2013.01)

(58) Field of Classification Search
None
See application file for complete search history.

(56) References Cited

U.S. PATENT DOCUMENTS 6,185,329 B1 *   2/2001   Zhang et al. ................... 382/176
7,136,072 B2 *  11/2006   Ritter ............................. 345/588
(Continued)

FOREIGN PATENT DOCUMENTS

CN     1570977    1/2005
CN   101360174    2/2009
(Continued)

OTHER PUBLICATIONS

Alparone L et al:"Texture-Based Analysis Techniques for the Classification of Radar Images", IEEE Proceedings F. Communications, Radar & SignalProcessing, Institution.
(Continued)

*Primary Examiner* — Feng Niu
(74) *Attorney, Agent, or Firm* — Jack Schwartz & Associates, PLLC

(57) ABSTRACT

The invention proposes a method for reconstructing a self-similar textured region of an image. Said method comprises determining pixels of a part of the self-similar textured region by copying sample pixels from a sample part of the self-similar textured region, the sample pixels being selected using a neighborhood matching, wherein a size of neighborhoods used for matching is selected based on an analysis of descriptors computed from coefficients of OCT transform of differently sized blocks of the sample part. The analysis of descriptors computed from coefficients of DCT transform of differently sized blocks of the sample part allows for determining the neighborhood size close to a feature size of the texture.

4 Claims, 3 Drawing Sheets

(51) Int. Cl.
*G06T 7/40* (2006.01)
*G06T 11/00* (2006.01)

(56) References Cited

U.S. PATENT DOCUMENTS

| | | | |
|---|---|---|---|
| 7,508,983 B2 * | 3/2009 | Enomoto | 382/173 |
| 8,285,064 B2 * | 10/2012 | Haddad et al. | 382/250 |
| 8,498,335 B2 * | 7/2013 | Holcomb et al. | 375/240.03 |
| 2005/0002569 A1 | 1/2005 | Bober et al. | |
| 2009/0003441 A1 * | 1/2009 | Sekiguchi et al. | 375/240.13 |
| 2009/0086814 A1 * | 4/2009 | Leontaris et al. | 375/240.02 |

FOREIGN PATENT DOCUMENTS

| | | |
|---|---|---|
| CN | 101573730 | 11/2009 |
| JP | 07184158 | 7/1995 |
| JP | 11112979 | 4/1999 |
| JP | 2004507177 | 3/2004 |
| JP | 2004348741 | 12/2004 |
| WO | WO0215586 | 2/2002 |
| WO | WO2009091080 | 7/2009 |

OTHER PUBLICATIONS

Joan S Weszka et al:"A comparative Study of Texture Measures for Terrain Classification", IEEE Transactions on Systems, Man and Cybernetics, IEEE Inc. New York, US, vol. SMC-5, No. 4.
Manian V et al:"On the use of transform features for SAR image classification", Geoscience and Remote Sensing Symposium Proceedings, IGARSS '98. Seattle, WA, USA.
Strand J et al: "Local Frequency Features for Texture Classification", Pattern Recognition, Elsevier, GB, vol. 27, No. 10.
Wei L-Y et al:"Fast Texture Synthesis Using Tree-Structured Vector Quantization" Computer Graphics.SIGGRAPH 2000, Conference Proceedings. New Orleans.
Search Report Dated Feb. 17, 2012.
Racape et al., "Adaptive Texture Characterization/Synthesis for Advanced Compression Scheme", 19th European Signal Processing Conference, Barcelona, Spain, Aug. 29, 2011, pp. 1-10.
Ashikhmin, "Synthesizing Natural Textures", Proceedings of ACM Symposium on Interactive 3D Graphics, Research Triangle Park, North Carolina, USA, Mar. 19, 2001, pp. 277-286.
Kwatra et al., "Graphcut Textures: Image and Video Synthesis Using Graph Cuts", Proceedings of ACM Symposium on Interactive 3D Graphics, Monterey, California, USA, Apr. 27, 2003, pp. 277-286.
Kwatra et al., "Texture Optimization for example-based synthesis", Proceedings of ACM Symposium on Computer Graphics and Interactive Techniques, Los Angeles, California, USA, Jul. 31, 2005, pp. 795-802.
Dumitras et al., "A texture replacement method at the encoder for bit-rate reduction of compressed video", IEEE Transactions on Circuits and Systems for Video Technology, vol. 13, No. 2, Feb. 2003, pp. 163-175.
Zhu et al., "Video coding with spatio-temporal texture synthesis", 2007 IEEE International Conference on Multimedia and Expo, Beijing, China, Jul. 2, 2007, pp. 112-115.
Ndjiki-Nya et al., "Generic and robust video coding with texture analysis and synthesis", 2007 IEEE International Conference on Multimedia and Expo, Beijing, China, Jul. 2, 2007, pp. 1447-1450.
Deforges et al., "Color LAR Codec: A color image representation and compression scheme based in local resolution adjustment and self-extracting region representation", IEEE transactions on circuits and systems for video technology (TCSVT), vol. 17, No. 8, Aug. 2007, pp. 974-987.
Sabha et al., "Texture Synthesis using Exact Neighborhood Matching", Computer Graphics forum, vol. 26, No. 2, Jun. 2007, pp. 131-142.
Suhring, "H264 AVC software coordination", http://iphome.hhi.de/suehring/tml/download/KTA/, Jan. 2010, p. 1.
Amadasun et al., "Textural Features Corresponding to Textural Properties", IEEE Transactions on Systems, Man and Cybernetics, vol. 19, No. 5, Sep./Oct. 1989, pp. 1264-1274.
Smach et al., "Generalized Fourier Descriptors with Applications to Objects Recognition in SVM Context", Journal of Mathematical Imaging and Vision, vol. 30, Dec. 1, 2007, pp. 43-71.
Hong et al., "Synthesising Textures Using Variable Neighbourhood", Microcomputer Information, vol. 22, No. 6-1, Jun. 2006, pp. 225-227. English Abstract.

* cited by examiner

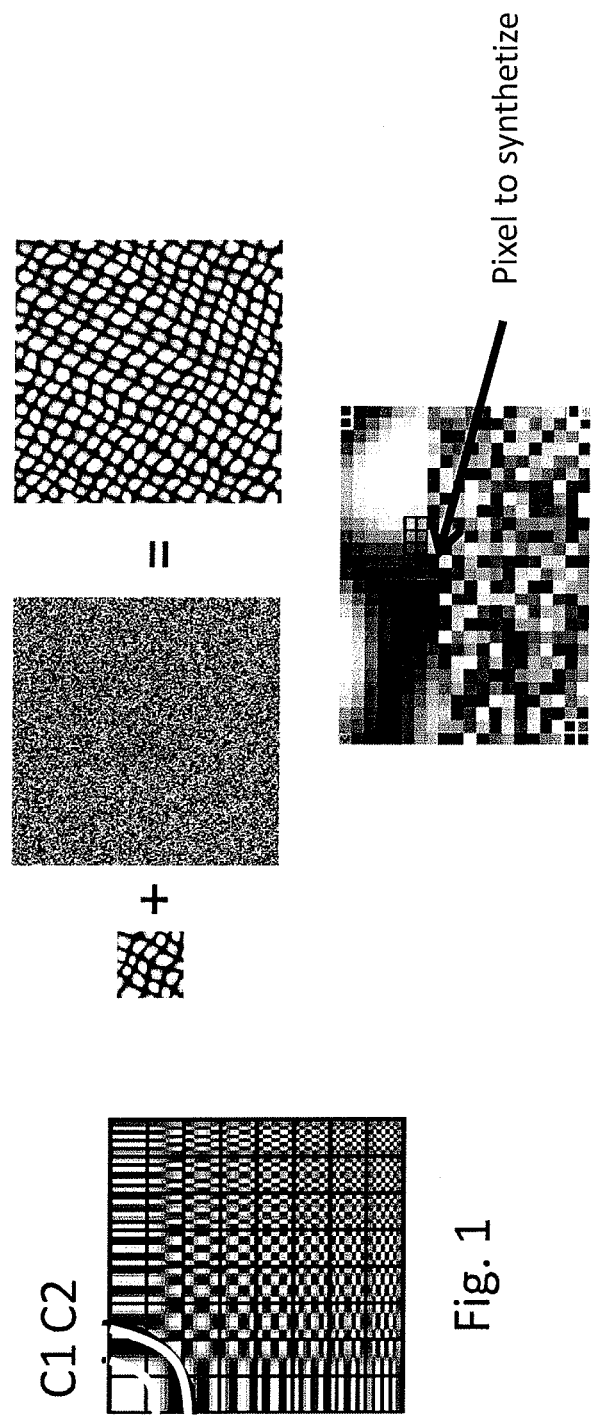

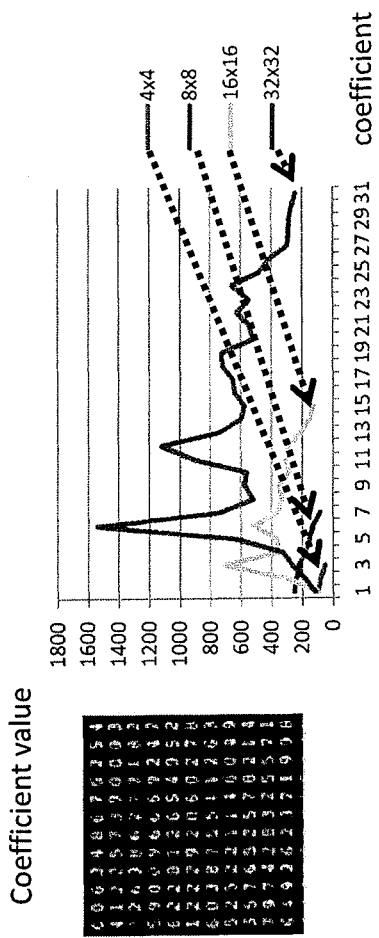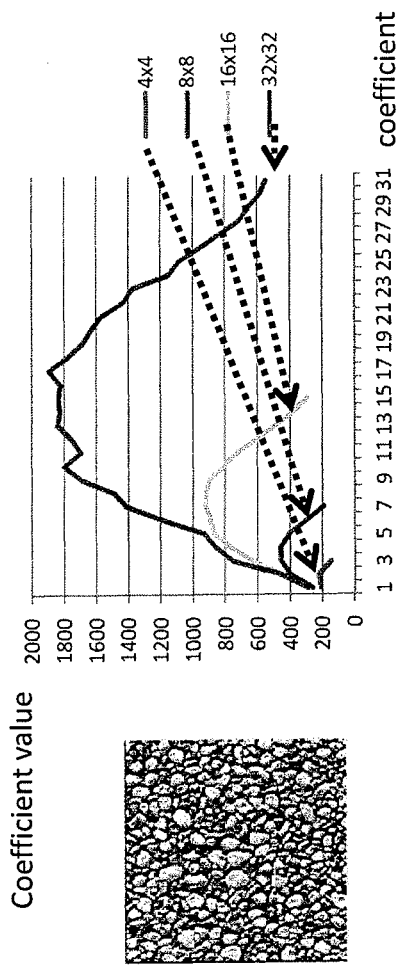
Fig. 3
Fig. 4

METHOD AND DEVICE FOR RECONSTRUCTING A SELF-SIMILAR TEXTURED REGION OF AN IMAGE

This application claims the benefit, under 35 U.S.C. §365 of International Application PCT/EP2011/069855, filed Nov. 10, 2011, which was published in accordance with PCT Article 21(2) on Jun. 7, 2012 in English and which claims the benefit of European patent application No. 10306308.7, filed Nov. 29, 2010.

TECHNICAL FIELD

The invention is made in the field of reconstruction of self-similar textured image regions.

BACKGROUND OF THE INVENTION

Self-similar textured regions in images induce high bit rates in encoding, in particular but not only in high definition encoding, while at the same time raise only limited interest by an observer. The interest of the observer is only focused on such regions in case the region shows discontinuities in structure or luminance.

In principal, the self-similarity of the texture allows for reducing the bit rate by encoding of only a sample part of the textured region and reconstruction of pixels of the non-encoded further part of the textured region by copying pixels of the sample part. Reconstruction is also known as synthesizing.

For instance, Li-Yi Wei and Marc Levoy: "Fast texture synthesis using tree-structured vector quantization", 2000, *Proc. of the 27th annual conference on Computer graphics and interactive techniques* (SIGGRAPH '00), ACM Press/Addison-Wesley Publishing Co., New York, N.Y., USA, 479-488, proposed a pixel-based reconstruction scheme in which a part of a texture region is reconstructed based on a pixel by pixel selection process.

Selection of a sample pixel for use for reconstruction of a given non-encoded pixel can be based on maximal similarity of a neighbourhood of the given non-encoded pixel with a neighbourhood of the sample pixel among sample pixel candidates.

SUMMARY OF THE INVENTION

The selection of the sample pixel dependents on the size of the neighbourhood used for selection. Different neighbourhood sizes can result in different sample pixels for reconstruction of a same non-encoded pixel. Neighbourhoods larger than a feature size of the texture in principle are suited for reproducing the texture well but require large sample parts for actually reproducing the texture in good visual quality. Neighbourhoods smaller than the feature size of the texture are resulting in poor reproductions. Thus, it is desirable to provide a method and device for reconstruction of a self-similar textured region of an image which adaptively selects the neighbourhood size close to the feature size of the texture.

The inventors therefore propose the method of claim 1 and the device of claim 3.

Said method comprises determining pixels of a part of the self-similar textured region by copying sample pixels from a sample part of the self-similar textured region, the sample pixels being selected using a neighbourhood matching, wherein a size of neighbourhoods used for matching is selected based on an analysis of descriptors computed from coefficients of DCT transform of differently sized blocks of the sample part.

In an embodiment, the method further comprises the steps of receiving a bit stream in which the sample part of the self-similar textured region is encoded and decoding the sample part In a further embodiment of the method the size of the neighbourhoods used for matching is adaptively selected by determining the coefficients by applying a DCT transformation on each of the differently sized blocks, determining, for each of the differently sized blocks, an associated sequence of descriptors wherein each descriptor is determined using sums of coefficients summed along parallel paths, selecting that sequence of descriptors which is the sequence associated with the smallest block size among those sequences which are not monotone decreasing and determining the size of the neighbourhoods using a size of the differently sized block associated with determined sequence.

Said device comprises a processing device. The processing device is adapted for determining pixels of a further part of the self-similar textured region by copying sample pixels from a sample part of the self-similar textured region, the sample pixels being selected using a neighbourhood matching, wherein the processing device is adapted for selecting a size of the neighbourhoods used for matching using an analysis of sequences of descriptors computed from coefficients of DCT transform of differently sized blocks of the sample part.

In an embodiment, said device further comprises a receiver and a decoder. The receiver is adapted for receiving a bit stream in which the sample part of the self-similar textured region is encoded and the decoder is adapted for decoding the sample part.

The inventive concept can also be applied on an encoding device for determining suitable sample part size and/or for determining the sized of the non-encoded part or on both.

If applied on encoder side, the selected neighbourhood size can further be transmitted to a decoder.

BRIEF DESCRIPTION OF THE DRAWINGS

Exemplary embodiments of the invention are illustrated in the drawings and are explained in more detail in the following description. The exemplary embodiments are explained only for elucidating the invention, but not limiting the invention's disclosure, scope or spirit defined in the claims.

In the figures:

FIG. 1 depicts an exemplary DCT transform for an 8×8 block with exemplary parallel paths overlaid;

FIG. 2 depicts a basic prior-art pixel based reconstruction scheme as proposed by Wei and Levoy;

FIG. 3 depicts exemplary descriptor curves for different sized blocks;

FIG. 4 depicts further exemplary descriptor curves for different sized blocks;

EXEMPLARY EMBODIMENTS OF THE INVENTION

Figure 6:
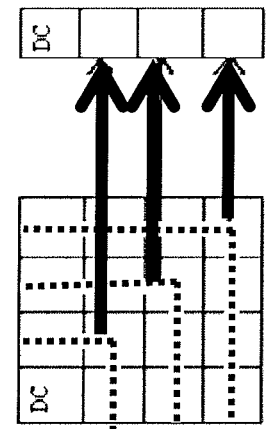
FIG. 6 depicts further exemplary parallel paths.

Textures, defined as stationary regions, can vary from regular or near-regular textures, in which a pattern is recopied at different locations (brick wall), to stochastic noisy textures (sand, grass . . . ).

This invention proposes a new characterization step, which can be applied in the field of computer graphics for autoadaptive algorithm and image/video compression scheme. The invention is based on the study of descriptors computed from the 2D Discrete Cosine Transform (DCT) coefficient depicted in FIG. 1 for a 8×8 block. After having computed DCT coefficients of a block of a self-similar textured image region, descriptor vector components are computed from AC coefficients crossed by parallel paths centered on the DC coefficient, for example circles centered on the DC coefficient as exemplarily depicted in FIG. 1. The descriptor vector components correspond to the sums of coefficients that are crossed over by these parallel paths. The sums can be computed over equidistant parallel paths. Further the sum can comprise weighting factors for the coefficient summed up, the weighting factors depending on the length of the path section crossing the respective coefficient. Then, at least two sizes must be tested to select the better by studying the variation of the descriptor vector.

The DCT coefficients are computed from:

$$C(u, v) = \frac{1}{4}\alpha_i\alpha_j \sum_{x=0}^{N-1}\sum_{n=0}^{N-1} I(m, n)\cos\left(\frac{(2m + 1)u\pi}{2N}\right)\cos\left(\frac{(2n + 1)v\pi}{2N}\right)$$

where I(m,n) corresponds to the luminance value at position (m,n), N is the size of the support block, $$\alpha_u = \begin{cases} \frac{1}{\sqrt{2}} & \text{if } u = 0 \\ 1 & \text{otherwise} \end{cases}$$

$$\alpha_v = \begin{cases} \frac{1}{\sqrt{2}} & \text{if } v = 0 \\ 1 & \text{otherwise} \end{cases}$$

Then FIG. 1 shows the first circles C1 and C2 representing the two first components of the descriptor vector since the DC value is not kept for average luminance invariance. Descriptors can be computed following:

$$D_{DCT}(\lambda) = \int_{\theta=0}^{\frac{\pi}{2}} |C(\lambda, \theta)|^2 \, d\theta$$

where C corresponds to the DCT coefficient at position ($\lambda \cos \theta$, $\lambda \sin \theta$) in transform domain.

The descriptor vector components characterize the texture of the transformed block. First information lies in the feature sizes of patterns inside a texture region. Synthesis algorithms, especially pixel-based techniques, are based on the comparison between groups of pixels. FIG. 2 depicts a basic prior-art pixel based reconstruction scheme as proposed by Wei and Levoy. The causal neighbourhood of the current pixel to synthesize, is compared to the same shaped window at every location in the patch, the one that minimize a L2 norm comparison is chosen and the candidate sample pixel from the patch is copied to current location.

The inventors noticed from texture results computed with different sizes of neighborhood that sizes greater than the feature size of the snake skin are able to produce visually good results, while lower sizes are definitely not. Moreover, this size must also not to be too large because it reduces the candidate set of pixels depending of the patch size.

A first component of the descriptor vector is computed from coefficients crossed over by circle C1 shown in FIG. 1. So it represents a single variation of luminance over the block in every direction. C2 represents a 1-periodic variation over the block and other coefficients are computed from higher frequencies so more detailed patterns. If the first component is the greatest value of the descriptor vector, the main pattern has a predominant uniform variation over the block. Its feature size is thus greater than the blocks size for computing DCT descriptors.

Therefore, if the first component has the greatest value, the descriptor vector is monotone and decreasing and the block size is not sufficient for being used as neighborhood in texture synthesis algorithms. Conversely, if other components are predominant (non monotone curve), the main pattern appears to be included into the block. Thus reconstruction can be based on a comparison of neighbourhoods with a correspondingly selected size.

FIG. 3 presents an exemplary case in point in order to better understand the descriptor curves study. In the example, a texture patch from "the matrix" is chosen which is composed of a main pattern of size about 12×12 pixels (distance between two neighboring figure centers). Curves represent the average descriptor of different sizes over the patch on the left.

According to the previous reasoning, an 8×8 size is not enough, while with size 16×16, higher frequencies are predominant, so the main pattern can be include in a 16×16 block. Using a 32×32 neighborhood is also possible but it means that the patch has to be large enough to contain a large set of 32×32 blocks, which is not always possible in video compression domain for example, where segmented texture regions are not large enough. FIG. 4 shows another example with gravels. The tiny gravels can be synthesized with a 4×4 neighborhood for practical purposes.

Figure 5:
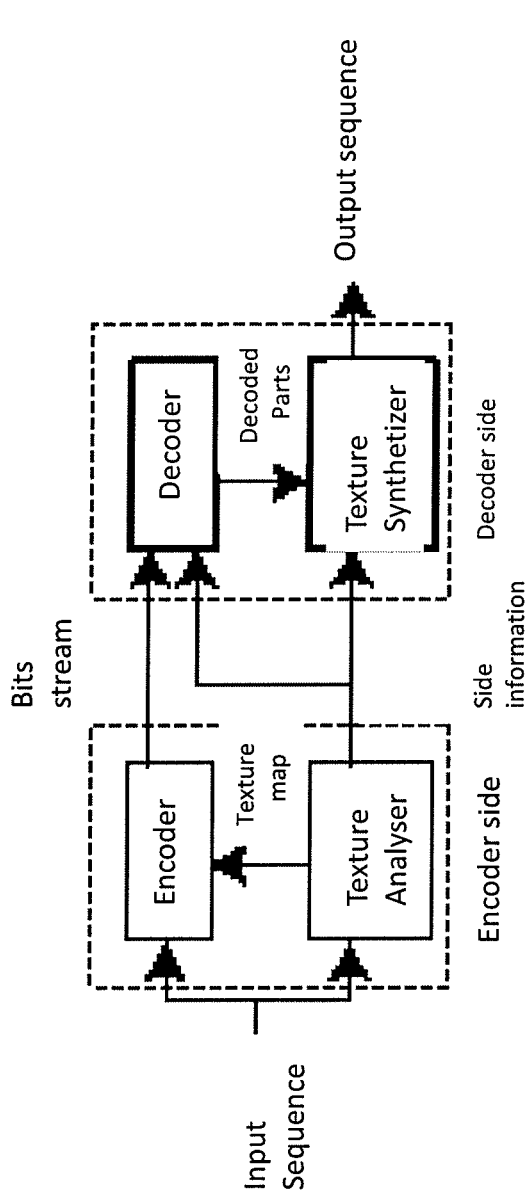
FIG. 5 depicts an exemplary texture reconstruction based encoding-decoding framework.

Texture synthesis can be used as an efficient compression technique for encoding of texture regions. Indeed, detailed texture regions are difficult to deal with, using classical transform-based compression schemes. FIG. 5 presents an exemplary synthesis-based framework. After having segmented textures at encoder side by a texture analyzer, large texture regions are removed from sent bit-stream, only a set of sample texture blocks, surrounding removed regions for instance, are kept to be used as patch at decoder side. The decoder first builds the image with edge blocks and patches; a texture synthesizer then fills the missing textures to output complete images.

In this context, DCT descriptors can be useful for different aspects.

First, after having segmented textures at encoder side, descriptors can be used at encoder side to decide whether texture synthesizer at decoder side is able to reconstruct this kind of texture or not. Further, the encoder can decide how much of the textured region can be omitted from encoding and how much is needed as sample by the decoder. And, the encoder can send the neighbourhood size for this texture region as side information. If no side information regarding the neighbourhood size is received by the decoder, the decoder can determine DCT descriptors from a received sample and then use them for determining an appropriate neighbourhood size for the reconstruction process.

A variety of parallel paths for computing descriptor vector components can be used. FIG. 6 shows another example of a descriptor vector on the right, computed from parallel equidistant paths over a 4×4 DCT block on the left.

Coefficients correspond to the sum of DCT coefficients crossed by dashed lines depicting exemplary paths. Since DC is not kept, the exemplary descriptor vector gets three components as shown by arrows.

The invention allows getting texture features to parameterize texture synthesis algorithms, depending on type, shape and featured size of texture patterns to synthesize.

The invention claimed is:

1. A method for reconstructing a self-similar textured region of an image, said method comprising:
   determining pixels of a part of the self-similar textured region by copying sample pixels from a sample part of the self-similar textured region, the sample pixels being selected using a neighbourhood matching,
   wherein a size of neighborhoods used for matching is adaptively selected by:
      determining the coefficients by applying a DCT transformation on each of the differently sized blocks,
      determining, for each of the differently sized blocks, an associated descriptor vector wherein each descriptor is determined using sums of coefficients summed along parallel paths,
      selecting the descriptor vector associated with the smallest block size among those descriptor vectors which are not monotone; and
      determining the size of the neighborhoods using a size of the differently sized block associated with the selected descriptor vector.

2. The method of claim 1, said method further comprising:
   receiving a bit stream in which the sample part is encoded, and
   decoding the sample part.

3. The method of claim 2, wherein said method further comprises receiving side information including a selected neighbourhood size.

4. The method of claim 2, wherein said method further comprises determining at least one descriptor vector from the received bit stream and use said at least one descriptor vector to determine a neighbourhood size.

* * * * *